April 14, 1964 T. C. HAWK 3,129,319
WELDING TORCH
Filed March 6, 1963
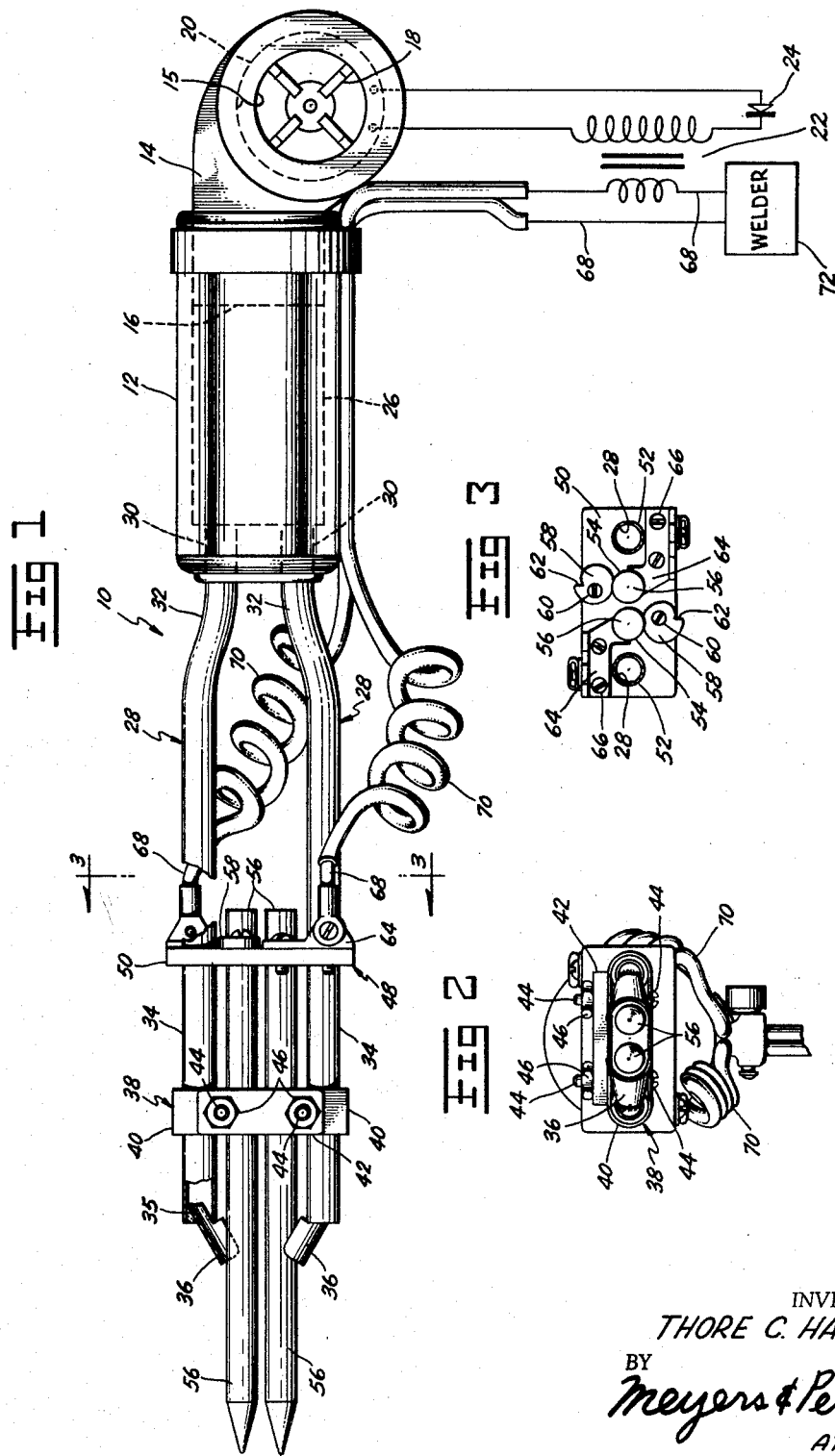
INVENTOR.
THORE C. HAWK
BY
Meyers & Peterson
ATTORNEYS

United States Patent Office 3,129,319
Patented Apr. 14, 1964

3,129,319
WELDING TORCH
Thore C. Hawk, 425 W. 3rd St., Rugby, N. Dak.
Filed Mar. 6, 1963, Ser. No. 263,167
9 Claims. (Cl. 219—75)

This invention relates generally to carbon arc welding and pertains more particularly to a twin carbon welding torch having certain improved characteristics over the torch disclosed in my Patent No. 3,035,155 granted May 15, 1962.

While my patented welding torch has performed very satisfactorily in actual practice, the present invention has for an object the provision of a torch of this same general character that has a simpler construction. It is also another object of the invention to provide an improved welding torch that will be easier to operate. Still further, it is an aim of the instant invention to provide fan means as an integral part of the welding torch.

These and other objects and advantages of my invention will more fully appear from the following description, made in connection with the accompanying drawing, wherein like reference characters refer to the same or similar parts throughout the several views and in which:

FIGURE 1 represents a top plan view of one form my improved welding torch may assume, the view being only relative inasmuch as the torch there shown can be held in different positions;

FIGURE 2 is an end view looking from the left in FIGURE 1, and

FIGURE 3 is a sectional view taken generally in the direction of line 3—3 of FIGURE 1.

Referring now in detail to the drawing, my improved welding torch has been denoted in its entirety by the reference numeral 10. It will be perceived from FIGURE 1 that the torch 10 includes a generally cylindrical handle 12. To one end of the handle 12 is secured a fan housing 14 having an inlet at 15 and a discharge at 16, the discharge or outlet from the fan housing being telescopically received within the handle 12. The fan housing 14 has rotatably mounted therein a bladed rotor or impeller 18 which is driven by an electric motor 20 shown only in dotted outline inasmuch as it is on the far side of the housing 14. The power source for operating the motor 20 is derived from a small current transformer 22 energized by the welding current, as will be later described. A rectifier 24 in the secondary circuit of this transformer 22 may, or may not be used, depending upon the type of fan motor. Hence, the speed of the fan motor 20, and therefore the amount of air, will vary directly with the welding current, which is a desirable feature.

Within the cylindrical housing 12 is a plenum chamber 26. This chamber 26 has communication with the discharge or outlet 16 of the fan housing 14. Extending outwardly from the left end of the plenum chamber 26 are two tubular members 28 for conveying air to the welding zone. More specifically, the two tubes 28 include relatively short parallel portions 30 that extend into the handle 12 so as to receive air from the plenum chamber 26. Intermediate portions 32 of the tubes 28 diverge outwardly from each other and merge into relatively long parallel portions 34 that terminate in discharge openings or outlets at 35. In order to direct the air flow in the proper manner, inclined or converging semicircular deflectors 36 have one end thereof attached to the ends of the tubular members 28 adjacent their outlets 35.

Inasmuch as the tubular portions 34 are to be retained in a parallel relationship with each other, it is planned that a spacer device 38 be employed. As illustrated, the spacer 38 includes a pair of U-shaped clamps 40 that partially encircle the tubular portions 34. These U-shaped clamps 40 have an electrically insulating strip or block 42 attached to the leg portions thereof at one side. The means of attaching the strip or block 42 to the U-shaped clamps 40 in the pictured situation constitute a pair of bolts 44 that extend through each of the legs of the clamps 40 and nuts 46 on said bolts. Consequently, the tubular portions 34 are retained in a laterally spaced relationship with each other, and as already indicated, these portions 34 are parallel to each other.

Next to be described is a movable electrode holder 48 that includes a slidable plate 50. The plate 50 is guided in a rectilinear path by reason of a pair of outer apertures 52 of a size to prevent the slidable movement of the plate 50 along the tubular portions 34. For a purpose soon to be understood, a pair of inner apertures 54 are also formed in the plate 50.

The apertures 54 receive the adjacent ends of a pair of elongated carbon electrodes 56. While other clamping mechanisms can be utilized, it will be observed that each of the carbon electrodes is held within its appropriate aperture 54 by means of an eccentric or cam 58 pivotally carried on a screw 60. To facilitate the manipulative rotation of the eccentrics 58, each eccentric or cam is formed with a notch at 62. Hence, when it is desired to clamp or grip an electrode 56, the particular eccentric 58 associated with that electrode is merely rotated sufficiently until its periphery bears tightly against the end of the electrode received in the aperture 54 in the plate 50.

From FIGURE 3, it can be discerned that contact shoes 64 are mounted so as to reside in a substantially diametrical position with respect to the eccentrics 58. Thus, when the eccentrics 58 are properly rotated, the electrodes are forced into firm engagement with said shoes 64. The shoes 64 are mounted on the plate 50 through the agency of a plurality of screws 66. The contact shoes 64 each have a conductor 68 electrically connected thereto, the two conductors 68 being protected by conventional flexible insulation 70. The conductors 68 extend to a conventional welder 72 that is to supply the welding current for the electrodes 56 and the energizing current for the fan motor 20 via the current transformer 22, the primary winding of the transformer being in series with one of the conductors 68 and the secondary winding thereof being in series with the motor.

The use of my welding torch 10 should be readily understood from the information that has herein been given. It will be appreciated that the carbon electrodes 56 are quite long to begin with, but as they are consumed by the electric arc passing between their tips an adjustment must be made to compensate for this consumption. This is the function of the slidable electrode holder 48, for as the electrodes 56 are consumed, the operator merely pushes the plate 50 forwardly and thereby keeps the length of the electrodes extending beyond the discharge outlets 35 at a relatively constant distance. By doing this, the operator can always maintain the proper amount of air at the tips where the arc is. It will be appreciated from FIGURE 1 that the air exits via the openings 35 and that the deflectors 36, by reason of their convergence, direct the air inwardly toward the electrodes 56. Sufficient air follows the projected length of the electrodes 56 to the welding zone where the air is needed.

Compared with my patented welding torch, it will be realized that the advancement or adjustment of the electrodes 56 in the present instance is far simpler than in my prior device. In my patented torch, the electrodes were held at an angle, and this created problems with respect to the facile adjustment of the electrodes as they were consumed. My prior device also caused some problems with respect to having the air properly directed to the electrodes, owing to the inclination or angularity of said electrodes with respect to each other. By providing the parallel tubular portions 34 and having the electrodes 56 themselves maintained in parallelism with each other, the advancement of the electrodes 56 is simplified over my patented torch. Due to the parallelism of the electrodes 56, it is also possible to perform good welds in relatively inacessible areas, the lack of inclination or angularity of the electrodes 56 permitting them to be inserted into such confined and limited quarters.

It will, of course, be understood that various changes may be made in the form, details, arrangements and proportions of the parts without departing from the scope of my invention as set forth in the appended claims.

What is claimed:

1. A welding torch comprising:
   (a) a pair of tubular members terminating in a pair of laterally spaced openings for discharging gas into a welding zone, and
   (b) means movable with respect to said tubular members for supporting a pair of elongated carbon electrodes in a parallel relationship with each other and for advancing said electrodes between said laterally spaced openings to compensate for consumption of said electrodes.

2. A welding torch in accordance with claim 1 in which:
   (a) said tubular members have parallel portions outwardly spaced from said electrodes, and
   (b) said movable supporting means is guided in a rectilinear path by said parallel tubular portions.

3. A welding torch in accordance with claim 2 including:
   (a) converging deflectors carried by said tubular members at their discharge openings for directing gas toward said electrodes.

4. A welding torch comprising:
   (a) a pair of tubular members having spaced parallel portions terminating in a pair of laterally spaced openings for discharging gas into a welding zone;
   (b) a plate member having a pair of spaced apertures encircling said parallel tubular portions to thereby render said plate member slidable with respect to said tubular portions, and
   (c) means on said plate member for mounting a pair of carbon electrodes in a parallel relationship with each other,
   (d) whereby slidable movement of said plate along said tubular portions will advance said electrodes relative to said discharge openings to compensate for electrode consumption.

5. A welding torch in accordance with claim 4 in which said electrode mounting means includes:
   (a) a second pair of apertures for receiving the ends of said electrodes, and
   (b) means adjacent said second pair of apertures for clampingly engaging said electrodes to hold said electrodes in their said parallel relationship.

6. A welding torch in accordance with claim 5 including:
   (a) means fixedly engaging said tubular members near their said discharge openings to maintain said portions parallel.

7. A welding torch in accordance with claim 6 including:
   (a) a hollow handle means;
   (b) means for supplying a gas into one end of said handle means, and
   (c) means for connecting the other ends of said tubular members to said handle means in order to receive gas via said handle means.

8. A welding torch in accordance with claim 7 in which said gas supplying means includes:
   (a) a motor driven fan carried on said one end of said handle means.

9. A welding torch in accordance with claim 8 including:
   (a) a welder for supplying welding current to said electrodes, and
   (b) a current transformer in series with said welder and electrodes for energizing said motor driven fan in accordance with the amount of welding current supplied to said electrodes.

References Cited in the file of this patent

UNITED STATES PATENTS 3,035,155    Hawk _____ May 15, 1962